April 21, 1936.  R. B. MacMULLIN  2,037,809
CHEMICAL MANUFACTURE
Filed Jan. 6, 1934
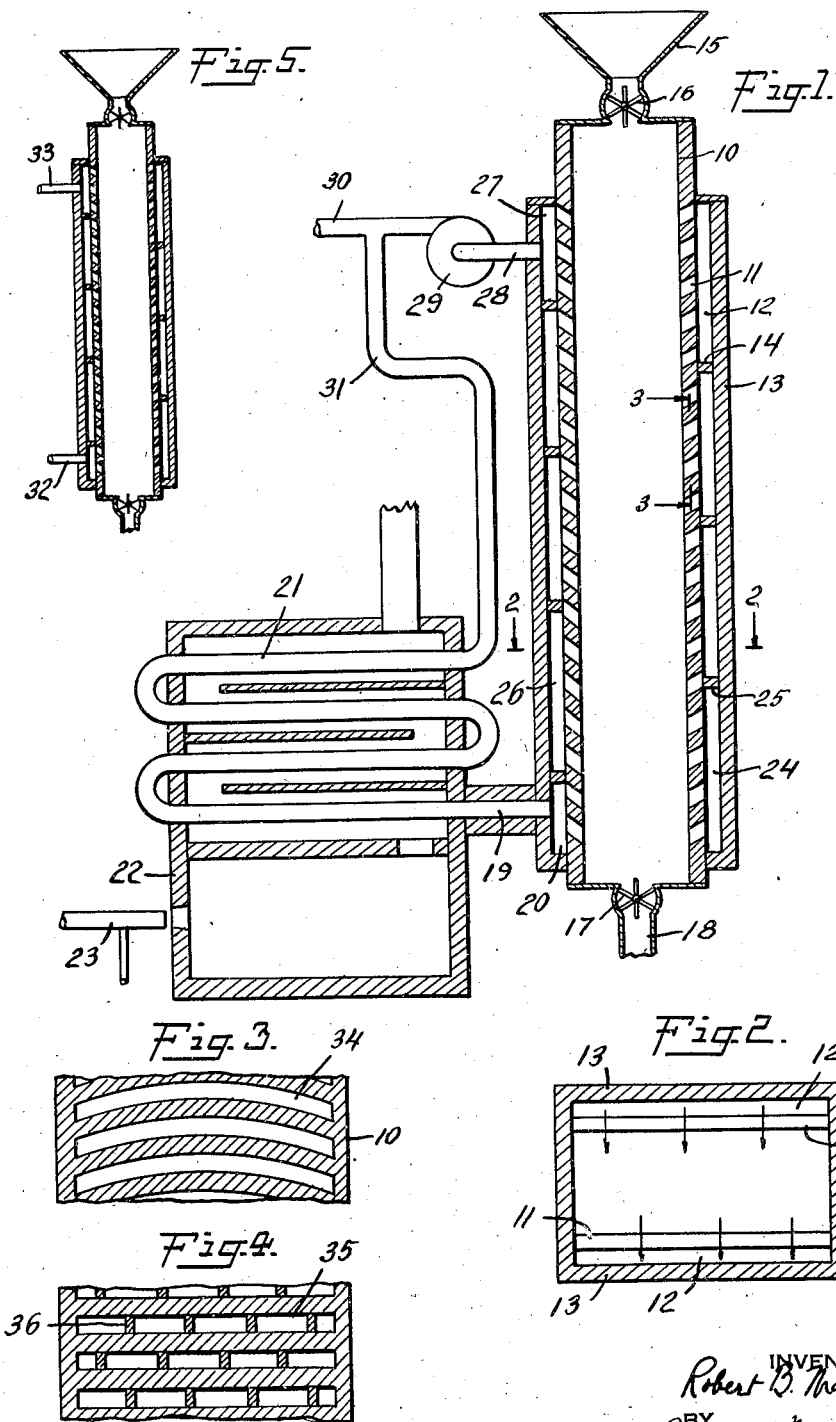
INVENTOR
Robert B. MacMullin
BY
Pennie Davis Marvin Edmonds
ATTORNEYS Patented Apr. 21, 1936

2,037,809

UNITED STATES PATENT OFFICE 2,037,809

CHEMICAL MANUFACTURE

Robert B. MacMullin, Niagara Falls, N. Y., assignor to The Mathieson Alkali Works, Inc., New York, N. Y., a corporation of Virginia Application January 6, 1934, Serial No. 705,538

4 Claims. (Cl. 263—29)

This invention relates to the treatment of solids with gases, as, for example, in the calcination of crushed carbonate rocks, such as limestone and dolomite, the roasting of sulfide ores, and the treatment of ores with chlorine for the purpose of facilitating the separation of the metal therein. More particularly, the invention is concerned with a novel method and apparatus by which crushed or fine sized granular solids may be treated with gases, the use of the principles of the invention making it possible to obtain a uniform treatment of the solids and to treat granular solids of small size at relatively low cost.

The method and apparatus of the invention may be advantageously employed for the purposes above indicated, as well as numerous others, but in order that the invention may be readily understood, its application to the calcination of limestone with recovery of carbon dioxide will be illustrated and described in detail. It is to be understood, however, that the utility of the invention is not limited to the treatment of that particular material, although its use in that connection affords certain special advantages which will presently be pointed out.

The burning of limestone in a vertical shaft kiln in accordance with present standard practice is ordinarily restricted to the use of relatively large lumps of stone, since when spalls or small chips of stone of sizes varying, for example, from ¼" to ¾", are burned in a standard vertical kiln, the resistance to the passage of the gases through the charge is so high that excessive power is consumed in maintaining the draft on the kiln. Also, in kilns fed with a mixed charge of small stone and coke, it is difficult to maintain a uniform temperature over each and every horizontal cross-section of the kiln, with the result that lime obtained from one side of the shaft may be under-burned while that from the other side may be over-burned. In the calcination of lime, carbon dioxide is evolved and its is a valuable product, the recovery of which is in some instances quite as important as the production of lime. While the gases evolved from a kiln which contain, for example, 40% carbon dioxide are suitable for use in certain chemical processes, a much higher test carbon dioxide is desired for use in solidification, but the conventional shaft lime kiln is not well adapted for the production of carbon dioxide of this degree of purity.

The present invention is, accordingly, directed to the provision of a method and apparatus which may be used generally for the treatment of solids with gases and is particularly useful in the calcination of carbonate rock, such as limestone, for the production of either substantially pure carbon dioxide or a gas of lower carbon dioxide strength. At the same time, the use of the principles of the invention makes it possible to burn stone of small sizes without excessive cost for power in maintaining the draft and to produce lime of substantially uniform quality.

According to the method of the invention, the solids to be treated with the gas are maintained in an elongated mass or body and the treating gas is admitted laterally into the mass and withdrawn laterally from the mass at a place spaced along the mass from the point of introduction. The introduction and withdrawal of the gas laterally are then repeated throughout the length of the mass and in this way, the entire mass is treated but the gas is not drawn through the mass from end to end. The resistance offered to the passage of the gas lengthwise through the mass is much greater than that encountered by the gas making a transverse pass through the mass of solids. Accordingly, by introducing and withdrawing the gas in the manner described, the power required to maintain the desired draft may be greatly reduced and the solids treated may be of much smaller size than it has heretofore been possible to handle.

In the production of substantially pure carbon dioxide from limestone, the gas used to treat the stone is carbon dioxide and it is heated to a high temperature before it is brought into contact with the stone. The gas gives up heat to the stone in sufficient amount to cause the evolution of carbon dioxide and at the conclusion of the treatment, a part of the combined treating gas and evolved gas is withdrawn to storage while the remainder is reheated and used again. In the production of 40% carbon dioxide, the charge to undergo treatment includes both the limestone and a combustible, such as coke, and the gas first entering the mass is air for combustion. As the treatment proceeds, carbon dioxide is evolved and this gas mingled with the combustion gases and air flows through the mass in the manner described. At the end of the treatment, the gas mixture is led to storage.

One suitable form of apparatus for the practice of the new method includes a vertical shaft kiln of substantially rectangular section with the wider walls false and provided with a series of horizontal louvers. Outside each wide wall is another wall which is gas-tight and baffles are provided between the walls to sub-divide the space into gas chambers which act as manifolds to receive gas from and discharge it through the louvers. The charge is introduced into the kiln at the top and passes down by gravity and the hot treating gas is introduced into the lowest gas chamber. The gas flows from this chamber through the louvers and passes transversely through the charge and into a gas chamber on the other side of the kiln, thence back through the charge. The flow of the gas through the charge in a series of lateral or transverse passes continues throughout the length of the kiln and in each pass, the gas flows only through the thickness of the charge. Because of this, the total resistance encountered by the gas in its flow may be relatively small as compared with that which it would encounter if it were directed lengthwise through the charge. Also, the flow of the gas in the manner described results in a relatively uniform distribution of heat and prevents the development of channeling which would result in an uneven distribution of the gas through the charge.

For a better understanding of the invention, reference may be had to the accompanying drawing, in which there are illustrated different forms of the apparatus for practicing the method of the invention. In the drawing, Figure 1 is a view in vertical section of one form of apparatus in which the heating medium is a circulating gas;

Figures 2 and 3 are sectional views on the lines 2—2 and 3—3, respectively, of Figure 1;

Figure 4 is a view similar to Figure 3 showing a modified construction; and

Figure 5 is a sectional view of a modified form of the apparatus.

Referring now to the drawing, the apparatus illustrated comprises a vertical shaft 10 which may be constructed of any suitable refractory material, such as standard refractory brick, and this shaft is of rectangular section and its wide walls are provided with louvers 11. Outside the wide walls are gas chambers 12 lying between the walls of the shaft and outer walls 13 which are gas-tight and of a suitable refractory material. The gas chambers are in part defined by baffles 14 which are preferably staggered in the chambers on opposite sides of the shaft, and the entire structure is well insulated on the outside in accordance with standard practice.

The charge is fed into the shaft at the top from a hopper 15 provided with a gas-tight feeding device 16 and the burned material is discharged at the bottom through a gas-tight feeder 17 into a conduit 18. In the apparatus illustrated, heat is imparted to the solid material to be treated by means of the treating gas and the charge introduced into the shaft includes only the solids to be treated.

The gas is introduced into the kiln through the pipe 19 which leads into the gas chamber 20, the gas having previously been heated by passage through the coil 21 in furnace 22 heated in any suitable manner as, for example, by means of a burner 23. The gas entering the chamber 20 flows through the louvers opening out of that chamber into the mass of solids and the gas flows through the charge and escapes through the louvers in the opposite wall into the gas chamber 24. The gas is prevented by baffle 25 from escaping from the chamber 24 except by return through the mass of solids and the gas returns generally laterally through the solids and enters the chamber 26.

The lateral passage of the gas through the solids continues throughout the height of the shaft and the gas thus gradually works upward while the solid charge flows downward by gravity. It is to be understood that the gas may not flow directly through the mass in all cases and that there is no sharp line of demarcation in the movement of the gas across the charge in opposite directions. Also, there will probably be a quantity of the gas which will flow upward directly through the mass. However, the gas so flowing will be a relatively small proportion of the total amount of gas and the major portion will flow transversely of the charge in a series of passes. When the gas reaches the topmost gas chamber 27, it passes out through the conduit 28 leading to the intake side of a blower or fan 29 and part of the gas discharged from the blower is then led through the conduit 30 to storage, while the remainder passes through the conduit 31 to the heating coil 21 for recirculation.

The advantage of causing the gas to pass laterally through the charge a number of times rather than to pass vertically through the charge from bottom to top will be apparent from the following considerations. The resistance to passage of the gas through a porous bed of material is directly proportional to the length of the passage and inversely proportional to the cross-sectional area. Accordingly, if the dimensions of the kiln are denoted as follows:

$a$ = length
$b$ = width
$h$ = height
$k$ = proportionality constant dependent only on the physical nature of the bed of solids through which the gas is to pass, then the resistance of the gas through an ordinary shaft may be expressed as:

$$R_1 = k \cdot \frac{h}{a.b.}$$

In a kiln of the type illustrated, the gas passes laterally through the shaft instead of lengthwise and in this case the resistance can be expressed by the following equations in which the number of lateral passes through the shaft is designated as $n$:

$$R_2 = k \cdot \frac{n^2 b}{a.h}$$

Taking as a specific example, a kiln which is 4 feet long, 1 foot wide, and 40 feet high, the following values may be calculated:

| $\frac{R_1}{k}$ | n | $\frac{R_2}{k}$ |
|---|---|---|
| 10 | 4 | .100 |
| 10 | 6 | .225 |
| 10 | 8 | .400 |
| 10 | 10 | .625 |
| 10 | 20 | 2.50 |
| 10 | 40 | 10.00 |

Accordingly, it will be seen from the calculated values that, in the example given, the resistance encountered by the gas in 40 passes laterally is equal to the resistance encountered when the gas moves lengthwise through the mass, whereas for any less number of passes, the resistance to lateral flow is substantially less than that encountered in lengthwise flow.

In a kiln of the type described herein, only a relatively small number of transverse passes is required, as, for example, eight, and the resistance encountered by the gas in its travel from the point of admission to the point of discharge is only 1/25 of the resistance encountered by the gas traveling upwardly through the mass in a conventional kiln of the same dimensions. Because of this lower resistance, less power is required for maintaining the draft on the new kiln and it is possible to burn stone of much smaller or more finely crushed sizes than would otherwise be permissible.

In the apparatus illustrated in Figure 1, substantially pure carbon dioxide can be produced and by heating that portion of the gas which is recirculated to a temperature of approximately 3000° F., the heat imparted by the gas to the rock is sufficient to produce well burned lime which is discharged from the bottom of the shaft.

In the production of 40% carbon dioxide, the apparatus shown in Figure 5 may be used. This apparatus resembles that shown in Figure 1 except that there is no provision of recirculation of the gas. The charge fed into the top of the shaft includes both the limestone and the combustible, such as coke, and air for combustion is fed into the bottom gas chamber through a pipe 32 and the evolved gases are carried away through the discharge pipe 33.

In Figures 3 and 4, there are shown details of the louvers and these may have the arched form illustrated at 34 in Figure 3 or the openings may be horizontal, as indicated at 35 in Figure 4. With the latter construction, the divisions of the wall defining the openings are connected by vertical supporting members 36.

In all forms of the invention illustrated, the gas flows transversely in a series of passes through the mass of solids to be treated and as a result encounters little resistance to flow and is evenly distributed through the mass. In the new kiln more uniform heating conditions are thus obtained, lime of a better quality is produced, and the cost of operation is substantially lessened, as compared with a shaft kiln of standard type.

I claim:

1. Apparatus for treating solids with a gas which comprises an elongated chamber unobstructed from end to end and having a pair of refractory opposed walls provided with openings, a refractory outer wall beyond each of said opposed walls, refractory partition means between each of said opposed walls and its outer wall and with said walls defining gas chambers in communication with the interior of said elongated chamber through said openings, means for introducing solids into said elongated chamber at one end thereof, means at the other end of said elongated chamber for the discharge of said solids, means for admitting gas into one of said gas chambers, means for withdrawing gas from a gas chamber spaced from the chamber into which the gas is introduced, means for conducting a portion of the gas withdrawn to storage, and means for heating the remainder of the gas and returning it to the system.

2. Apparatus for treating solids with a gas which comprises an elongated vertical shaft unobstructed from end to end and having a pair of refractory opposed walls provided with louvers, a refractory wall outside of each of said opposed walls, refractory baffles between each of said opposed walls and its outer wall and with said walls defining gas chambers in communication through said louvers with the interior of the shaft, means at the top of the shaft for introducing solids into the shaft, means at the bottom of the shaft for withdrawing solids from the shaft, means for introducing gas into a chamber adjacent the bottom of the shaft, means for conducting a portion of the withdrawn gas to storage, and means for heating the remainder of the withdrawn gas and returning it to the gas chamber adjacent the bottom of the shaft.

3. A method of calcining limestone which comprises advancing the crushed limestone in the form of an elongated mass, heating a gas containing carbon dioxide, passing the heated gas laterally through the mass of limestone alternately in opposite directions for a plurality of passes, the gas moving countercurrent to the direction of movement of the limestone between successive passes, withdrawing the gas from contact with the limestone and delivering a portion to storage, and reheating the remainder of the gas and recirculating it through the limestone in the manner described.

4. A method of calcining limestone which comprises continuously advancing crushed limestone while maintaining it in the form of an elongated mass, heating a gas containing carbon dioxide, passing the heated gas laterally through the mass alternately in opposite directions for a plurality of passes, the gas traveling countercurrent to the direction of movement of the limestone between successive passes, withdrawing the gas from contact with the limestone and delivering a portion to storage, reheating the remainder and recirculating it through the mass laterally in the manner described, and continuously supplying limestone to the mass at one end and withdrawing it at the other end.

ROBERT B. MacMULLIN.